United States Patent [19]

Takabatake

[11] Patent Number: 5,091,164
[45] Date of Patent: Feb. 25, 1992

[54] POROUS CARBON-CARBON COMPOSITE AND PROCESS FOR PRODUCING THE SAME

[75] Inventor: Minoru Takabatake, Kamisumachi, Japan

[73] Assignee: Petoca Ltd., Tokyo, Japan

[21] Appl. No.: 453,105

[22] Filed: Dec. 21, 1989

Related U.S. Application Data

[63] Continuation-in-part of Ser. No. 247,238, Sep. 21, 1988, abandoned.

[30] Foreign Application Priority Data

Sep. 22, 1987 [JP] Japan .................. 62-238221

[51] Int. Cl.$^5$ ............................................. C01B 31/02
[52] U.S. Cl. ................................. 423/445; 423/449; 264/29.1; 264/29.5; 264/45.3
[58] Field of Search ............... 423/445, 449; 264/29.1, 264/29.5, 45.3

[56] References Cited

U.S. PATENT DOCUMENTS

| | | | |
|---|---|---|---|
| 2,799,052 | 7/1957 | Stroup | 423/449 |
| 3,283,040 | 11/1966 | Stover | 423/449 |
| 3,419,645 | 12/1968 | Pietzka et al. | 264/29.5 |
| 3,558,276 | 1/1971 | Otani | 423/449 |
| 3,814,642 | 6/1974 | Araki et al. | 423/447.1 |
| 3,888,958 | 6/1975 | Juntgen et al. | 423/449 |
| 4,005,181 | 1/1977 | Hill et al. | 423/449 |
| 4,198,382 | 4/1980 | Matsni et al. | 423/449 |
| 4,205,055 | 5/1980 | Maire et al. | 423/449 |
| 4,412,675 | 11/1983 | Kawakubo | 423/449 |
| 4,434,206 | 2/1984 | Fukuda et al. | 264/29.1 |
| 4,822,538 | 4/1989 | Yoshida et al. | 264/29.5 |

FOREIGN PATENT DOCUMENTS 49-40078 10/1974 Japan .................. 423/449
59-107913 12/1982 Japan .

*Primary Examiner*—Robert Kunemund
*Attorney, Agent, or Firm*—Armstrong, Nikaido, Marmelstein, Kubovcik & Murray

[57] ABSTRACT

A porous carbon-carbon composite having a porosity of 25–65%, higher strength and higher uniformity can be obtained by using carbon fibers having a fiber diameter of 2.5–32 micron and a fiber length of not longer than 2 mm in an amount of 60% by weight or more.

2 Claims, No Drawings

POROUS CARBON-CARBON COMPOSITE AND PROCESS FOR PRODUCING THE SAME

This application is a continuation-in-part of application Ser. No. 247,238, filed Sept. 21, 1988, now abandoned.

BACKGROUND OF THE INVENTION

1. Field of the Invention

This invention relates to a porous carbon-carbon composite and a process for producing the same. More particularly, it relates to a porous carbon-carbon composite having a suitable porosity and a high mechanical strength, which is superior in heat resistance, chemical resistance, and abrasion resistance, etc. and a process for producing the same.

The carbon-carbon composite of the present invention is useful as filter element materials, catalyst carriers, electrodes for fuel batteries, bearing parts, dry cell parts, accumulator parts, etc.

2. Prior Art

It is known that a porous carbon-carbon composite can be obtained by effervescing impregnation of a liquid carbonizable material into either a high strength, high modulus carbon fiber reinforcement material which is being wound to a desired shape, or into a material of a structure having a high strength, high modulus carbon fiber as its principal material, e.g., woven fabrics, three-dimensional woven fabrics, non-woven fabrics, unidirectionally arranged sheets, or by cutting a reinforcement material of a high strength, high modulus carbon fiber in short length, mixing it with a liquid carbonizable material and causing it to foam, followed by, in either way, carbonization and, if necessary, graphitization, with the liquid carbonizable material being used as a precursor of matrix carbon.

The problem of this process is that it is difficult to uniformly arrange the reinforcement material and pores. Thus, there are parts where mechanical strength is markedly different in the composite. Also distribution of pores is apt to be localized. On this account, the shaped products often have weakness and it is necessary to handle the products as a fragile thing. Also, since the distribution and arrangement of pores tend to be non-uniform, the quality of the product as a filter element material or a material for retaining a certain liquid is not good.

In order to solve this problem, a reinforcement material fiber was cut in very short length or proportion of the content of a reinforcement fiber was made smaller in prior processes. However, there is a problem in such processes, that effectiveness of use of a reinforcement material is not sufficient. As an alternative solution, a method is proposed in which very fine glass hollow cubes are mixed. However, this leads to introduction of impurities into a composite after carbonization as well as reduction of electric properties and corrosion resistance. There is also a problem in this method that production of a continuous pore type porous composite is difficult.

As a process for producing porous carbon materials which is different from the above-mentioned process, there is disclosed in U.S. Pat. No. 3,829,327 a method in which a web of a carbon fiber is coated with pyrolytic carbon formed by CVD process. This method has an advantage of forming products superior in chemical and electrical properties, but there are problems that this method is costly and strength is notably reduced if a carbon material having a large porosity is made.

Also, in U.S. Pat. No. 3,991,169, a process wherein a higher alcohol is caused to adhere to a pitch fiber mat to help local melt-adhesion of a pitch fiber is disclosed. But this method has a problem that a product having a high mechanical strength is difficult.

Also, U.S. Pat. No. 3,960,601 discloses a fibrous web obtained by infusiblization and carbonization treatment of a pitch fiber web produced by blow-spinning. However, a porous carbon material produced by this method is essentially an aggregate of a fiber and pore size is small. If it is attempted to make porosity larger, there is a problem that its mechanical strength is reduced.

It is an object of the present invention to overcome a problem of difficulty in making the distribution of a reinforcement material and pores uniform at the time of shaping and carbonizing a porous carbon-carbon composite, which difficulty brings about great changes of strength in the composite and thereby results in weak parts in the composite, a problem that pores arrange in a certain manner and weak parts are formed in the composite, and a problem that handling of the composite material is difficult due to formation of such weak parts.

The above-mentioned object can be accomplished according to the process of the present invention.

The present invention resides in a process for producing a pitch-based porous carbon-carbon composite which contains 60% by weight or more of a carbon fiber having a fiber diameter in the range of 2.5-32 micron, and fiber length of not longer than 2 mm, and which has a porosity in the range of 25-65%, and a method for producing the same.

A process for producing the pitch-based porous carbon-carbon composite of the present invention is characterized in pressure-molding a carbonaceous raw material consisting of from 60 to 90% by weight of a carbon fiber in short fiber form having a fiber diameter of 2.5-32 micron and a fiber length of not longer than 2 mm and not shorter than 30 micron and from 40 to 10% by weight of a pitch ground to 60-200 mesh and having a softening point of not lower than 220° C. at a temperature in the range of 5° to 100° C. lower than the softening point of said pitch and at a pressure in the range of from 80 to 400 kg/cm$^2$, carbonizing the resulting product under an inert atmosphere substantially at atmospheric pressure and, if necessary, graphitizing to give a product having a porosity of 25-65%. The pressure-molding process is performed substantially in the absence of water.

The carbon fiber which is a raw material of the porous carbon-carbon composite of the present invention may be of any type. Those which show a small difference in dimensional change from that of the precursor of matrix carbon at the time of carbonization and graphitization are preferred. Pitch-based carbon fibers, particularly those which are produced from a raw material of an optically anisotropic pitch are more preferred to carbon fibers produced from a PAN type synthetic fiber.

The carbon fiber useful in the present invention is preferably one which is produced at carbonization temperature not higher than 1000° C. Since the higher the carbonization temperature, the greater the tendency of dimensional stability of a carbon fiber, a porous carbon-carbon composite prepared by using a carbon fiber as a reinforcement material and a pitch as a binder shows a greater dimensional change of the binder than that of the carbon fiber at the time of carbonization of the binder. Thus, cracks and detachment are apt to be produced on the boundary between fiber and matrix carbon. Most preferably, carbonization temperature is not higher than 800° C. It is also preferable that the reinforcement material is a pitch fiber which has been only subjected to infusiblization treatment.

A carbon fiber may be changed into a short fiber by cutting with a cutter or grinding. Ease of changing a carbon fiber into a short fiber varies according to carbonization temperature. Those produced at a carbonization temperature around 1000° C. are easily changed into a short fiber. Fibers produced by lower carbonization temperature are apt to form fiber-balls and difficult to be ground. Fibers produced at too high carbonization temperature are apt to form longitudinal splitting and have tendency of turning to microfine fibers, and they are difficult to be changed into a short fiber.

A blend of a short carbon fiber and a high softening point pitch is carbonized after being molded at a temperature lower than the softening point of said pitch by 5°–100° C. and at a pressure of 80–400 kg/cm², Molding temperature is preferably lower than the softening point of said pitch by 10°–50° C. and shaping pressure of 100 to 300 kg/cm² is preferred. As a high softening point pitch, those having a softening point of not lower than 220° C. are used. Preferably an optically anisotropic pitch having a softening point of not lower than 240° C. is used. The higher the softening point of a pitch used as a binder, the faster the carbonization treatment rate and more advantageous in carbonization efficiency.

The softening point herein is a value measured by a Koka-type flow tester. A process for measuring a softening point by using a Koka-type flow-tester (manufactured by Shimazu Seisakusho) is carried out as follows.

Firstly, a sample is inserted into a heating block. Under an elevated pressure of 10 kg/cm², temperature is elevated at a rate of 6° C./min and a specific volume curve is measured. The apparent specific volume decreases with elevation of temperature, and in a certain temperature range, the reduction rate decreases rapidly and the volume change substantially stops. If temperature is raised further, samples flow out from a nozzle and the sample volume decreases. A softening point is obtained as an intersection point of two straight lines one of which is approximating the curve in the temperature range where there is no volume change and the other of which is approximating the curve in the range lower than the above-mentioned range. Mixing of a short fiber of a carbon fiber with a pitch powder can be carried out by a process generally used for mixing such materials.

Mixing of relatively small amounts can be carried out in a tumbler, a ball mill, a grinder or the like. They may be mixed in a dry state or in a state wet with water. Large amounts may be mixed where flow paths for fluid transportation joins.

It is also possible to carry out mixing of short fiber of a carbon fiber and a pitch powder by spraying the powder carried on a fluid upon a sheet of a short fiber. Insufficient thickness of a composite material may be ameliorated by laminating the sheets. Molding pressure is adjusted so that the porosity after carbonization is in the range of 25-65%. A porosity greater than 65% is not preferred because of notable reduction in the mechanical strength of the composite and a porosity less than 25% is not preferred because too strong compression brings about unevenness of porosity.

In order to improve resistance to heat, chemicals and the like, it is preferred to carry out carbonization and graphitization at a temperature of not lower than 1000° C.

EXAMPLE 1

A petroleum pitch based carbon fiber having a fiber diameter of 10 micron and carbonized at 600° C. was cut in fiber length of 1.2 mm and mixed with a ground 120 mesh petroleum pitch having a softening point of 235° C. in a ratio of 75 parts by weight of the short fiber and 25 parts by weight of the pitch powder.

The resulting blend was placed in a plate shaped mold having a thickness of 10 mm and shaped at 200° C. at a pressure of 210 kg/cm².

While elevating the temperature at a rate of 10° C./hr. up to 1000° C. under an inert gas atmosphere at atmospheric pressure, the above-mentioned product was carbonized. The resulting carbonaceous product had a porosity of 49% and a flexural strength of 305 kg/cm² in the direction of the surface of the plate and 103 kg/cm² in the direction of the thickness of the plate.

EXAMPLE 2

The fiber length of the short fiber of the carbon fiber of Example 1 was varied. After mixing the short fiber with a pitch powder as in Example 1, pressure molding was carried out. The resulting product was infusiblized by air oxidation as in Example 1, and further subjected to a carbonization treatment. The relation of the properties of the resulting porous carbon-carbon composites and the fiber length of the carbon fiber is shown in Table 1.

The maximum strength was determined by using a "three points bending test" essentially in accordance with ASTM D 790-86 using specimens having the physical characterization L40×W5×T3 mm, using a 30 mm span distance. Minimum strength was determined by measuring the bending strength relative to the direct thickness using the three points test using a specimen having the physical characteristics L10×W3×T0.6 mm at a span of 6 mm (essentially according to ASTM D 790-86). See page 388, formula (3).

Porosity was determined by measuring the differences between the weight of the dry product and the weight of the product after submersion in a liquid.

Aspect ratio can be determined by using Scanning Electron Micrograph pictures of the fibers.

Average particle diameter was determined using sieves having pass-through characteristics as defined infra.

| Mesh | Largest Mesh | Smallest Mesh |
| --- | --- | --- |
| 4 | — | 5 |
| 10 | 5 | 15 |
| 150 | 120 | 170 |
| 280 | 240 | 320 |
| 400 | 320 | 500 |

TABLE 1

Fiber length and properties of porous composites

| Test number | Fiber length mm | Porosity % | Max.Strength kg/cm² | Min.Strength kg/cm² |
| --- | --- | --- | --- | --- |
| 1(comparative example) | 5 | 68 | 80 | 22 |
| 2 | 0.8 | 45 | 330 | 110 |

TABLE 1-continued

| | Fiber length mm | Properties of porous composite | | |
|---|---|---|---|---|
| Test number | | Porosity % | Max.Strength kg/cm² | Min.Strength kg/cm² |
| 3 | 0.4 | 41 | 340 | 164 |
| 4 | 0.15 | 38 | 365 | 195 |
| 5 | 0.06 | 36 | 320 | 215 |

Effectiveness of the Invention

According to the present invention, it is possible to increase the fiber content. Thus, the present invention is a process for producing a porous carbon-carbon composite having a high strength and high uniformity.

What is claimed is:

1. A process for producing a porous carbon-carbon composite consisting essentially of pressure-molding a carbonaceous raw material consisting of from 60 to 90% by weight of a carbon fiber in short fiber form having a fiber diameter of 2.5 to 32 microns and a fiber length of not longer than 2 mm and not shorter than 30 microns and from 40 to 10% by weight of a pitch ground to 60 to 200 mesh and having a softening point of not lower than 220° C. at a temperature in the range of 5° to 100° C. lower than the softening point of said pitch at a pressure in the range of from 80 to 400 kg/cm², carbonizing the resulting product under an inert atmosphere substantially at atmospheric pressure to give a carbonized product having a porosity of 25 to 65%, wherein said pressure-molding is performed substantially in the absence of water.

2. A process for producing a pitch-based porous carbon-carbon composite comprising pressure-molding a carbonaceous raw material consisting of from 60 to 90% by weight of a carbon fiber in short form having a fiber diameter of 2.5 to 32 microns and a fiber length of not longer than 2 mm and not shorter than 30 microns and from 40 to 10% by weight of a pitch ground to 60 to 200 mesh and having a softening point of not lower than the softening point of said pitch at a pressure in the range of from 80 to 400 kg/cm², carbonizing the resulting product under an inert atmosphere substantially at atmospheric pressure and further graphitizing the carbonized product to give a porosity of 25 to 65%, wherein said pressure-molding is performed substantially in the absence of water.

* * * * *